UNITED STATES PATENT OFFICE.

JAMES A. HOLLADAY, OF NIAGARA FALLS, NEW YORK, ASSIGNOR TO ELECTRO METALLURGICAL COMPANY, OF NIAGARA FALLS, NEW YORK, A CORPORATION OF WEST VIRGINIA.

PROCESS OF OBTAINING MOLYBDENUM OR ALLOYS THEREOF.

1,281,961.     Specification of Letters Patent.     Patented Oct. 15, 1918.

No Drawing.     Application filed June 29, 1918. Serial No. 242,640.

*To all whom it may concern:*

Be it known that I, JAMES A. HOLLADAY, a citizen of the United States, residing at Niagara Falls, in the county of Niagara and State of New York, have invented certain new and useful Improvements in Processes of Obtaining Molybdenum or Alloys Thereof, of which the following is a specification.

This invention relates to the recovery of molybdenum, as metal or alloy, from ores, concentrates or compounds containing the same; and comprises a process whereby a relatively pure molybdenum product may be prepared from ores or concentrates, or from crude alkali-metal molybdates, which contain considerable proportions of phosphorus, arsenic, copper or other impurities. According to the invention in its preferred embodiment I first prepare a bolybdate slag, reasonably free from lead, and consisting essentially of sodium molybdate associated with impurities derived from the original ore, for example a wulfenite concentrate. This slag is then leached with water or preferably with a high dilute calcium chlorid solution whereby the molybednum content is largely dissolved, the impurities being to a large extent left behind as components of the insoluble sludge or residue. From the solution thus obtained the molybdenum may be precipitated directly as a calcium salt, and the molybdenum smelted out, preferably using silicon or ferrosilicon as the reducing agent.

A typical embodiment of my invention is the following, it being understood that the invention is not limited to the treatment of the particular ores mentioned by way of example, or to the manipulative or other operating details.

A typical wulfenite concentrate may contain:—

| | |
|---|---:|
| Molybdenum | 10.12% |
| Tungsten | 0.70% |
| Vanadium | 1.04% |
| Lead | 56.53% |
| Iron | 3.35% |
| Copper | 0.40% |
| Arsenic | 0.70% |
| Phosphorus | 0.174% |

This concentrate is smelted with a sufficient proportion of carbon for the reduction of the lead, and sufficient alkali, usually soda ash, to flux the molybdenum oxid. A typical charge for smelting comprises:—

| | |
|---|---:|
| Wulfenite concentrates | 100 parts |
| Soda ash | 32 parts |
| Charcoal | 4 parts |

This smelting operation yields a so-called molybdenum slag in which the molybdenum is present largely or entirely as sodium molybdate. In addition to sodium, such slag may contain for example:

| | |
|---|---:|
| Molybednum | 17.82% |
| Tungsten | 1.14% |
| Vanadium | 0.51% |
| Lead | 0.49% |
| Iron | 7.87% |
| Copper | 0.10% |
| Arsenic | 0.20% |
| Phosphorus | 0.16% |
| Carbon dioxid | 2.01% |

The slag is broken up or comminuted by grinding or otherwise and is then leached to extract the molybdenum. The slag may be leached with water but I prefer to use for this purpose a highly dilute solution of calcium chlorid, for example a solution containing in the neighborhood of 1.6% by weight of hydrated chlorid $CaCl_2.6H_2O$. Approximately thirty gallons of water will suffice for leaching 100 pounds of the slag. The leaching may be carried out under any desired conditions, and at normal or preferably somewhat higher temperatures. The resulting solution is separated by filtration or otherwise from the undissolved residue, and will be found to carry nearly all of the molybdenum, while a large proportion of the impurities remain with the residue. The filtrate is brought almost to the boiling point, and treated with an excess of calcium chlorid solution, thereby obtaining an almost quantitative precipitation of the molybdenum as calcium molybdate, which is filtered, washed and dried. This treatment results in the complete elimination of iron and copper, while the amounts of arsenic and phosphorus which remain in the sludge appear to vary somewhat according to the composition of the particular slag.

Employment at this stage of calcium chlorid solution of too high concentration will lead to excessive losses of molybdenum in the insoluble sludge. The most advantageous concentration in any particular case will depend upon the arsenic and phosphorus content of the sodium-molybdate slag, as well as upon other factors, including the amount of sodium carbonate which may be present, and which will of course tend to eliminate calcium as the carbonate. In general the concentration of the leaching solution will not exceed 5 per cent. of hydrated calcium chlorid, and should be such as to insure a commercially complete recovery of molybdenum while avoiding so far as possible the solution of arsenic and phosphorus.

Typical results obtained in the practice of this process, using water as the leaching agent are as follows:—

Extraction of molybdenum _____ 97.6%
Removal of phosphorus _____ 75.4%
Removal of arsenic _____ 60.7%

By using a dilute solution of calcium chlorid as the leaching agent the results secured were:

Extraction of molybdenum _____ 92.7%
Removal of phosphorus _____ 84.6%
Removal of arsenic _____ 77.7%

It has been found, in some cases at least, that the removal of phosphorus was more complete when the sodium molybdate was rather high in iron, hence I regard it as within my invention to add iron, preferably as a ferric compound, to the molybdate slag.

The use of calcium chlorid in the leaching operation is also of value in that it eliminates any excess of soda ash, by precipitation as calcium carbonate. It has been observed that if the precipitation of the calcium molybdate be carried out at a temperature approximating the boiling point of the solution, the precipitation is substantially quantitative, not over 1 to 2% of the molybdenum passing into the filtrate.

A typical molybdate prepared in this way may contain:

| | | | |
|---|---|---|---|
| $MoO_3$ | 53.43% | Mo | 35.62% |
| $V_2O_5$ | 0.89% | V | 0.50% |
| $WO_3$ | 3.21% | W | 2.55% |
| CaO | 31.47% | | |
| Fe | Nil. | | |
| Cu | Nil. | | |
| Pb | Nil. | | |
| P | 0.006% | | |
| As | Trace. | | |
| $CO_2$ | 5.79% | | |
| $H_2O$ (combined) | 3.20% | | |

From the calcium molybdate thus obtained a very high grade molybdenum or ferromolybdenum may be made by a simple smelting operation, preferably using silicon or ferrosilicon as the reducing agent and smelting the charge in an electric furnace. By proceeding in this way products containing up to 97% of molybdenum may be directly prepared; and ferromolybdenum may be made with an extremely low content of arsenic and phosphorus.

It will of course be understood that the calcium molybdate may be smelted by carbon, in case low-carbon products are not desired; also that in the manufacture of the ferro-alloy, the iron may be introduced into the charge in any desired form, for example as iron turnings or as ferric oxid.

I claim:

1. In the manufacture of molybdenum and its alloys, the process which consists in smelting a wulfenite concentrate or similar material to eliminate lead and produce a soluble molybdate slag; leaching the slag; and precipitating molybdenum from the leach liquor as calcium molybdate.

2. In the manufacture of molybdenum and its alloys, the process which consists in smelting a wulfenite concentrate or similar material to eliminate lead and produce a soluble molybdate slag; leaching the slag; precipitating molybdenum from the leach liquor as calcium molybdate; and smelting the calcium salt with silicon to recover molybdenum.

3. In the manufacture of molybdenum and its alloys, the process which consists in smelting a wulfenite concentrate or similar material to eliminate lead and produce a soluble molybdate slag; leaching the slag with a dilute solution of a calcium salt; and precipitating molybdenum from the leach liquor as calcium molybdate.

4. In the manufacture of molybdenum and its alloys, the process which consists in smelting a wulfenite concentrate or similar material to eliminate lead and produce a soluble molybdate slag; leaching the slag with a dilute solution of a calcium salt; precipitating molybdenum from the leach liquor as calcium molybdate; and smelting the calcium salt with silicon to recover molybdenum.

5. In a process of preparing molybdenum, the step which consists in leaching a molybdate slag with a dilute solution of a calcium salt.

6. In a process of preparing molybdenum, the step which consists in leaching a molybdate slag with a dilute solution of a calcium salt, and thereafter precipitating the molybdenum as calcium molybdate.

In testimony whereof, I affix my signature.

JAMES A. HOLLADAY.